US009630596B2

(12) United States Patent
Zalzalah (10) Patent No.: US 9,630,596 B2
(45) Date of Patent: Apr. 25, 2017

(54) COMBINATION TIRE VALVE CORE REMOVAL AND FLUID FILL TOOL

(71) Applicant: Plews, Inc., Dixon, IL (US)

(72) Inventor: James Zalzalah, Oregon, IL (US)

(73) Assignee: Plews, Inc., Dixon, IL (US)

( * ) Notice: Subject to any disclaimer, the term of this patent is extended or adjusted under 35 U.S.C. 154(b) by 0 days.

(21) Appl. No.: 15/167,463

(22) Filed: May 27, 2016

(65) Prior Publication Data

US 2016/0272167 A1    Sep. 22, 2016

Related U.S. Application Data

(63) Continuation-in-part of application No. 14/708,271, filed on May 10, 2015, now abandoned, which is a continuation of application No. 13/906,018, filed on May 30, 2013, now abandoned.

(60) Provisional application No. 61/653,105, filed on May 30, 2012.

(51) Int. Cl.
*B25B 27/24* (2006.01)
*B60S 5/04* (2006.01)
*B60C 29/06* (2006.01)
*F16K 51/00* (2006.01)
*B60C 25/18* (2006.01)
*F16L 37/088* (2006.01)
*F16L 37/28* (2006.01)
*B29C 73/16* (2006.01)

(52) U.S. Cl.
CPC .............. *B60S 5/043* (2013.01); *B60C 25/18* (2013.01); *B60C 29/062* (2013.04); *F16K 51/00* (2013.01); *F16L 37/088* (2013.01); *F16L 37/28* (2013.01); *B29C 73/166* (2013.01); *Y10T 137/6109* (2015.04); *Y10T 137/9029* (2015.04)

(58) Field of Classification Search
CPC ......... Y10T 29/53591; Y10T 29/53596; Y10T 137/3584; B60C 25/18; B60S 5/043
USPC ..... 137/315.41, 315.42; 81/15.2, 15.5, 15.6; 141/38; 29/221.6, 213.1
See application file for complete search history.

(56) References Cited

U.S. PATENT DOCUMENTS

| | | | | |
|---|---|---|---|---|
| 1,854,797 A * | 4/1932 | Kirkpatrick | ............ | B60C 29/00 137/231 |
| 1,985,759 A * | 12/1934 | Baumgartner | .......... | B60S 5/043 137/224 |
| 2,759,647 A * | 8/1956 | Boyer | ...................... | B60S 5/043 141/301 |
| 3,208,133 A * | 9/1965 | Morton | ................... | B60C 25/18 29/213.1 |
| 3,645,496 A * | 2/1972 | Rawlins | .................. | F25B 45/00 137/322 |
| 3,840,967 A * | 10/1974 | Olson | ..................... | B25B 27/24 137/328 |
| 3,889,558 A * | 6/1975 | Duncan | ................. | B25B 13/488 81/55 |

(Continued)

*Primary Examiner* — Reinaldo Sanchez-Medina
(74) *Attorney, Agent, or Firm* — Bay Area Technology Law Group PC (57) ABSTRACT

A tool attachable to a valve stem of a tire grips and removes the valve core from the valve stem prior to introduction of sealant through the tool into the tire. Subsequently, the valve core, which has been stored in the tool, may be reinserted into the valve stem. An external pressurized gas source may then be attached to the tool so that gas may be injected through the tool and the valve stem of the tire into the tire.

4 Claims, 8 Drawing Sheets

(56) References Cited

U.S. PATENT DOCUMENTS

| | | | | | |
|---|---|---|---|---|---|
| 3,996,765 | A | * | 12/1976 | Mullins | F25B 45/00 141/311 R |
| 4,005,847 | A | * | 2/1977 | Ekman | F16L 37/407 251/148 |
| 4,276,898 | A | * | 7/1981 | Ross | B29C 73/166 137/231 |
| 4,308,766 | A | * | 1/1982 | Myers, Jr. | B29C 73/166 81/15.6 |
| 4,599,776 | A | * | 7/1986 | Haggard | B25B 13/48 29/213.1 |
| 5,421,380 | A | * | 6/1995 | Campbell | B08B 9/08 137/327 |
| 5,665,908 | A | * | 9/1997 | Burkey | B60C 23/0496 137/228 |

* cited by examiner

COMBINATION TIRE VALVE CORE REMOVAL AND FLUID FILL TOOL

CROSS REFERENCE TO RELATED APPLICATION

This is a utility application claiming priority to provisional application Ser. No. 61/653,105 filed May 30, 2012 entitled "Combination Tire Valve Core Removal and Fluid Fill Tool" and to U.S. patent application Ser. No. 13/906,018 filed on May 30, 2013 and to U.S. patent application Ser. No. 14/709,271 filed on May 10, 2015.

BACKGROUND OF THE INVENTION

In a principal aspect the present invention comprises a tool for sequentially removing a valve core from a pneumatic tire valve stem, subsequently injecting a fluid sealant material through the valve stem into the tire, followed by replacement of the valve core in the valve stem and filling the tire by injecting air or some other gas or gas mixture through the valve stem.

Repair of modern automotive tires often involves removal of an object which has penetrated the tire followed by subsequent injection of sealant into the tire to seal the opening caused by the penetration. The technique for such repair typically includes removal of some of the air from the tire if the tire is not already depressurized and then injecting sealant material into the tire. The sealant material is typically injected through the tire valve assembly which includes a valve core fitted into a projecting valve stem that provides access to the interior of the tire. Thus, the repair operation will involve removal of the valve core, placing a source of sealant in communication with the valve stem opening from which the valve core has been removed, injection of sealant through that opening, waiting for the sealant to at least coat the interior of the tire, and subsequently replacing the valve core in the valve stem and filling the tire with air, nitrogen or an appropriate gas.

Removing the valve core in order to inject sealant and then replacing the valve core are operations which take time and, if not performed in a professional manner, may result in ineffective repair to the tire. Thus, there has developed a need for tools which will enhance the process of tire repair using the technique of injecting sealant into a damaged tire followed by timely pressurizing the tire. Efficient performance of those steps will enable economic repair of the tire which is pressurized by air or some other gas and which is subject to failure due to penetration by an item such as a nail or the like.

SUMMARY OF THE INVENTION

Briefly the present invention comprises a single tool which enables removal of a valve core from the valve stem of a damaged tire and subsequent injection through the tool of sealant followed by replacement of the valve core which has been retained by the tool. Further, the tool enables pressurizing the tire by subsequent flow of an appropriate gas through the tool and through the valve stem to the interior of the tire. As a consequence, multiple operations may be effected in a timely and efficient manner through the use of the single tool which enables removal and replacement of a valve core as well as the injection through the tool of an appropriate sealant and a pressurizing gas.

Thus, it is an object of the invention to provide an improved, utilitarian tool which enhances the efficiency of pneumatic tire repair.

A further object of the invention is to provide a tool which may be attached to the valve stem of a tire, by way of example, and may then effect efficient removal of the valve core from that valve stem in a manner which enables serial injection of a sealant through the valve stem and pressurized gas through the same valve stem with the valve core removed during the injection of sealant and in place during the injection of the gas.

Another object of the invention is to provide a single tool for useful in the repair of tires that are damaged by serially injecting a sealant and a pressurized gas.

Another object of the invention is to provide a tool which is easy to use, economical and which enhances the efficiency and timeliness of tire repair.

Another object, advantage and feature of the invention is to provide a tool which introduces a sealant into a tire through the valve stem of the tire and substantially immediate and subsequent pressurization of the tire to facilitate dispersion of sealant within the tire and effect closure of an opening in the tire as well as potential curing of the sealant.

These and other objects, advantages and features of the invention will be set forth in the detailed description which follows.

BRIEF DESCRIPTION OF THE DRAWING

In the description which follows, reference will be made to the drawing comprised of the following figures.

DETAILED DESCRIPTION OF EMBODIMENTS OF THE INVENTION

Figures 1, 2:
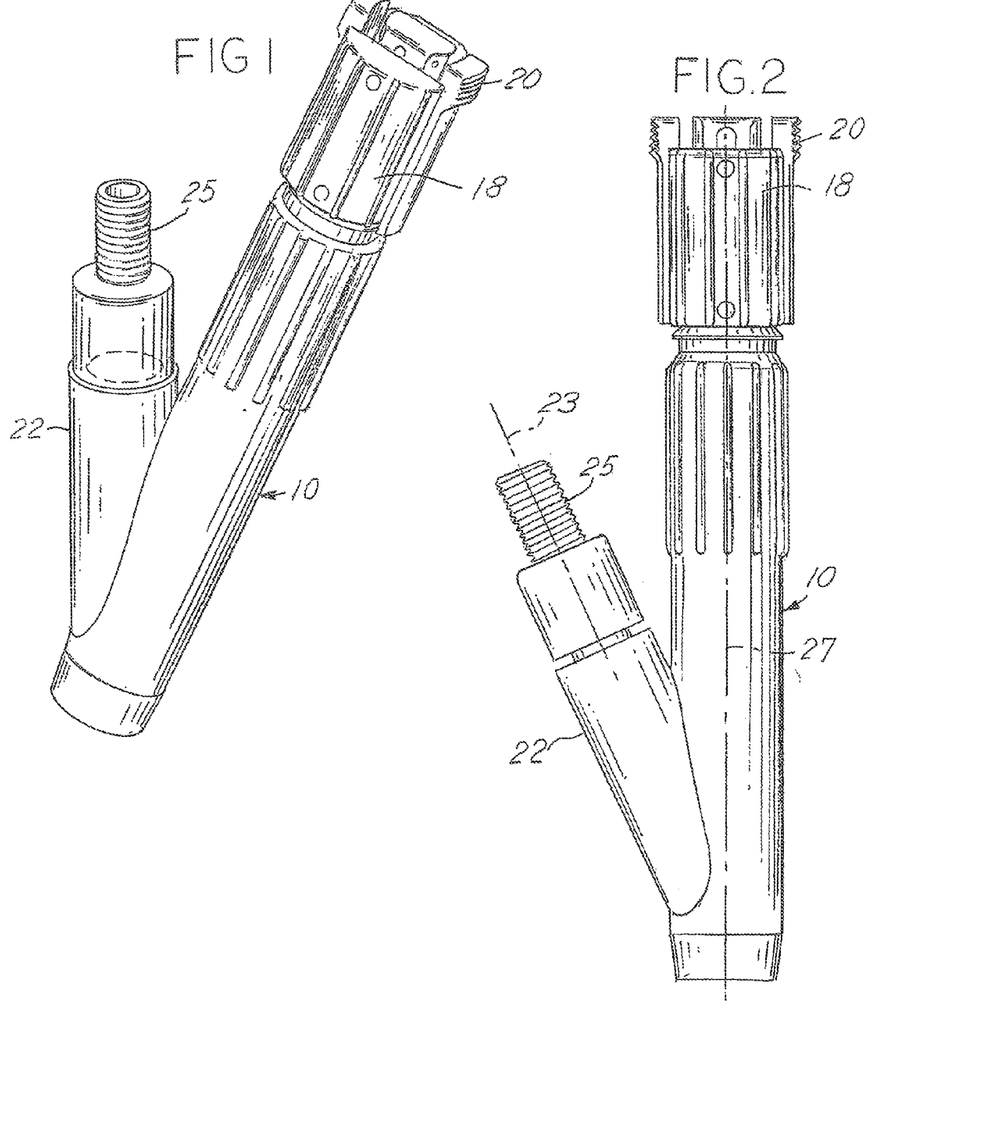
FIG. 1 is an isometric view of the tool of the invention which is designed for attachment to the valve stem of a tire to remove a valve core from the valve stem and retain the valve core while filling sealant and other liquids through the open valve stem into the tire. The tool also enables replacement of the valve core into the valve stem and inflation or deflation of the tire without being dismounted from the valve stem.
FIG. 2 is a plan view of the tool of FIG. 1.

The attached drawings illustrate an embodiment of the invention and various alternate aspects of an embodiment. FIG. 1 is an isometric view of one embodiment of the invention. The tool is designed to engage the valve core in the valve stem of a tire and cause at least partial deflation of the tire. The tool may then be manipulated to engage and remove the valve core from the valve stem of the pneumatic tire. The valve core is then removed from the valve stem and stored within the tool. Such removal is effected prior to introduction of sealant through an auxiliary passage of the tool and the valve stem into the tire. Subsequently, gas may be injected through the auxiliary or inlet passage of the tool to force sealant in the tool through the valve stem into the tire. Then the valve core, which had been removed from the valve stem of the tire and housed within the tool during sealant flow through the tool, may be reinserted into the valve stem by the means of the tool. The valve core is then engaged and opened by manipulating the tool to provide a gas flow passage through the auxiliary passage and valve stem into the tire. An external pressurized gas source, such as an air or nitrogen source, attached to the separate inlet passage of the tool may thereby inject gas through the tool and the valve stem to inflate the tire. Finally, when the tire is inflated, the tool may be by unthreading from the valve stem.

Figure 5:
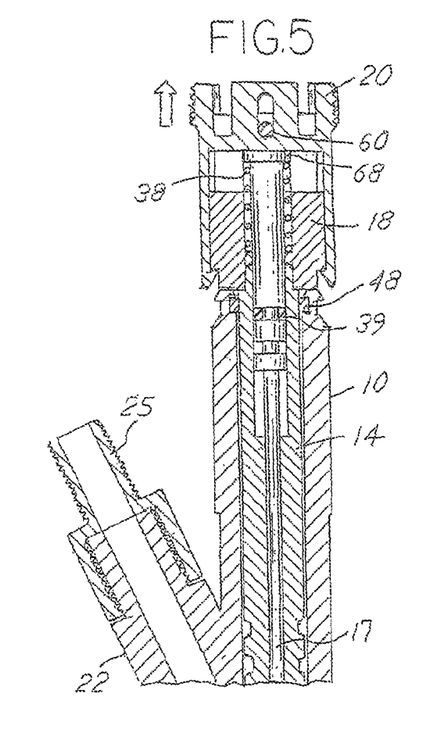
FIG. 5 is a partial sectional view of FIG. 4.

The tool includes is a body 10 with a longitudinal valve core storage passage 12 into which an annular piston 14 is fitted. The annular piston 14 includes a central passage 16 into which a pusher or valve core actuating rod or stem 17 is positioned. At the outer end of the passage 12, a first knob 18 is mounted or attached by a pin or screw 36 in passage 36A to engage and enable driving or moving the piston 14 longitudinally or axially along axis 27 by pushing or pulling the knob 18. In one embodiment as shown in FIG. 5, upper end 14A of piston 14 is configured in a shape keyed or compatible with opening 18A of knob 18 so that upon rotation of knob 18 the piston 14 is simultaneously rotated. A stem engaging knob 20 component of knob 18 is slidably fitted on knob 18 and is designed to engage the top of the stem or rod 17 to move it longitudinally within the cylindrical passage 16 of the piston 14. A transverse gas flow or gas and sealant inlet connector 22 connects with the longitudinal passage 12 in the body 10.

Further referring to FIGS. 1 and 2, the gas flow or gas inlet and sealant connector passage 22 is in the form of a conduit having a flow passage 22A with an axis 23. The passage 22A is connectable to a gas or air source through a threaded connector 25. The main section of body 10 and longitudinal passage 12 is comprised of a substantially straight, linear axis 27 which forms an angle in the range of 20°-40°, preferably in the range of about 25°, with the connector passage 22A and axis 23. The connector 22 thus defines a projection from the body 10 which may be gripped to facilitate rotation of the body 10 about axis 27 when attaching or threading outlet end 28 of the tool to a valve stem, such as the valve stem 24 depicted in various figures. That is, the tool is applied to the valve stem 24 by threading it onto the valve stem 24 at the threaded outlet end 28 of the body 10.

Figure 3:
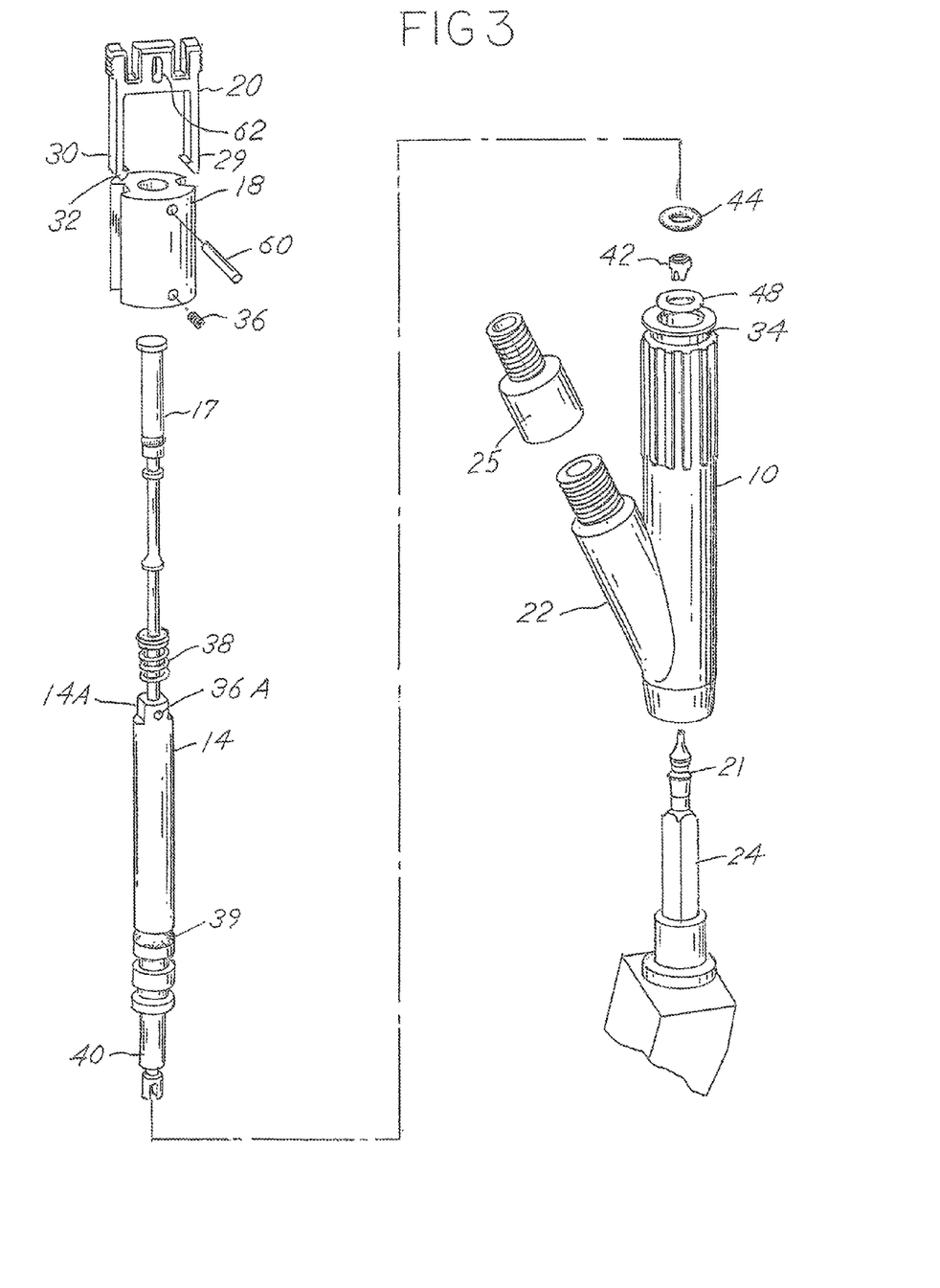
FIG. 3 is an exploded isometric view of the tool of FIG. 1.
Figure 3A:
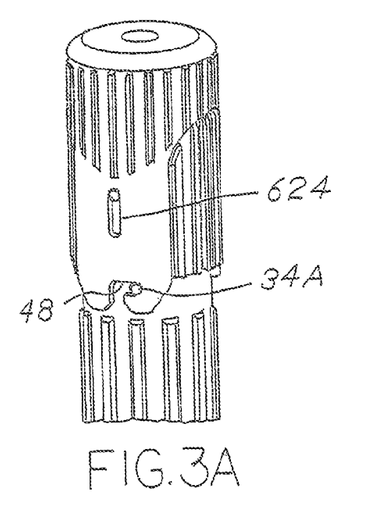
FIG. 3A is a pictorial view of a locking mechanism which ensures engagement or coupling of a piston member with a valve stem to enable removal of the valve core from the valve stem.
Figure 4:
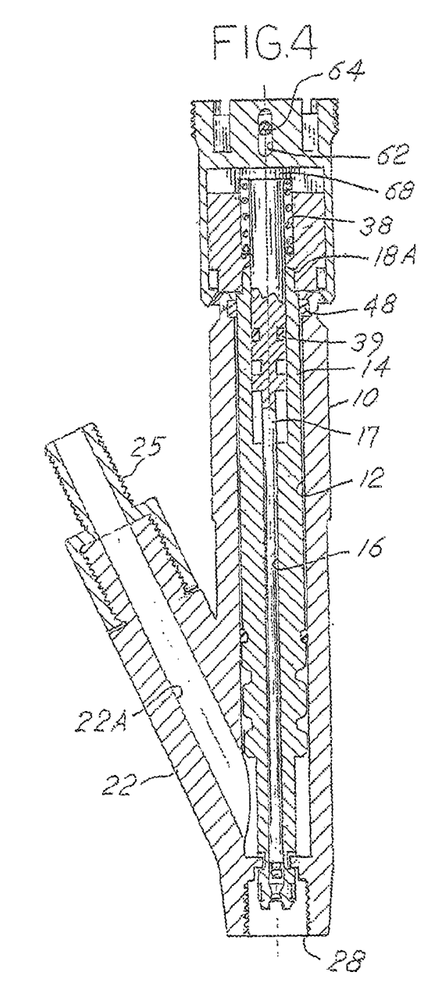
FIG. 4 is a plan sectional view of the tool of FIG. 1.
Figure 18:
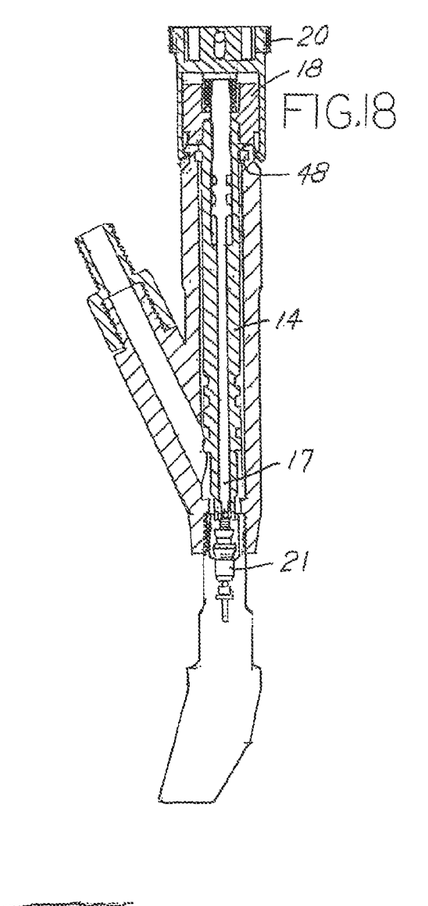
FIG. 18 is a sectional view of the tool wherein the tool is manipulated to engage the plunger of the valve core to open the air passageway through the tool and the valve stem for pressurizing the tire by supply of air through an air entry passage.
Figure 19:
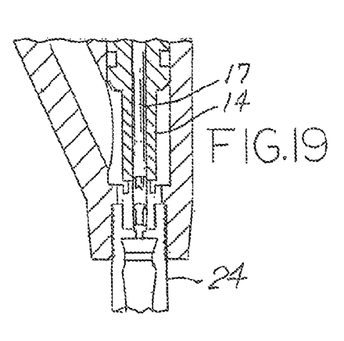
FIG. 19 is an enlarged sectional view of the position of the valve core prior to engaging the plunger of the valve core by the tool for injecting of air as depicted in FIG. 17.
Figure 20:
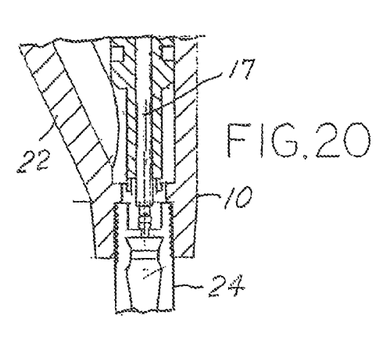
FIG. 20 is a partial sectional view illustrating the engagement of the plunger of the valve core by the tool to open the air passageway through the valve core to the interior of the tire as depicted in FIG. 18.

The component parts of the tool are illustrated in greater detail in FIG. 3. In one embodiment the knob 18 comprises a generally cylindrical, molded component part which slidably receives air knob 20. The air knob 20 includes generally parallel, longitudinal projecting spaced legs 29 and 30 that fit over and slide along the outer surface of the knob 18. The range of sliding motion is restricted by pin 60 of knob 18 in slot 62 of air control knob 62 (FIG. 4). The legs 29 and 30 terminate at their distal end with projecting tabs 32, such as shown in FIG. 18, as tabs 32. The tabs 32 are designed to engage an annular slot 34 in the upper end of the body 10 or alternately, in a second embodiment slots 32A which, upon depressing air knob 20 longitudinally along axis 27 against the force of spring 38 and rotation about axis 27, will engage and lock slots 34B of the air knob 20 with projections 34A as shown in FIG. 3A.

Figure 4A:
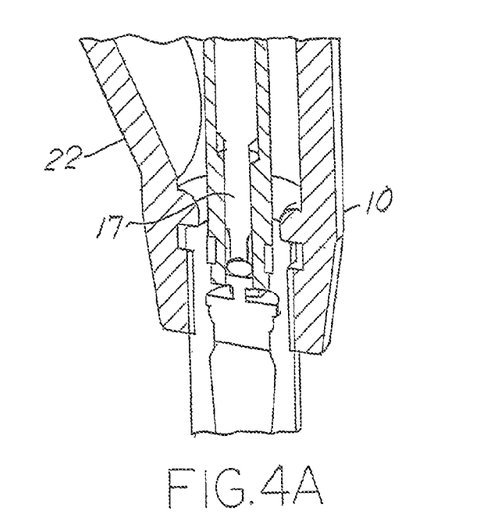
FIG. 4A is a partial sectional view similar to FIG. 4 depicting engagement of a valve stem by a piston member.
Figure 5A:
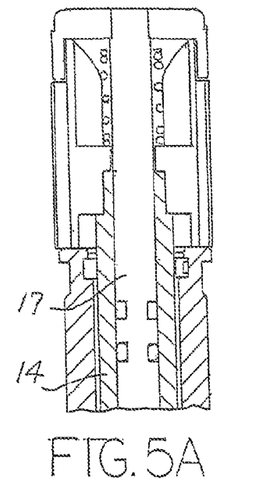
FIG. 5a is a partial sectional view of an alternative construction of the control knob assembly for the tool of FIG. 5.

In the embodiment of FIG. 4, the knob 18, which is attached to piston 14, is slidably mounted on the valve core pusher or rod 17. Further a pin 60 through air knob 20 fits in longitudinal slots 62 in air knob 20 over the upper end of stem 17 to limit travel of rod or stem 17 biased axially by spring 38 in the axial direction away from end 28. Thus the stem or pusher 17 fits into the generally cylindrical central passage 16 of the piston 14 and is biased by a spring 38 in an axial direction away from the outlet end 28 of the body 10. The slot 62 which engages pin 64 limits the axial travel of stem 17. Alternately, stem 17 may be keyed to cap 68 at the outer or top of stem engaging knob 20 as shown in FIG. 5A. Thus stem 17 which is biased longitudinally toward cap 68 by spring 38 is also keyed to the knob 20 and thus rotates with knob 20 and may move longitudinally against the force of spring 38 independently from movement of piston 14 in the embodiment of FIG. 4 or FIG. 4A.

The piston 24 will generally move in unison with the pusher or stem 17, except when the slots 62 or slots 62A are limited by pin 60 of air knob 20. As explained hereinafter, the pusher or stem 17 may be extended into the passage 12 independently from the piston 14 to thereby longitudinally or axially extend and engage a plunger of a valve core 21 to release air from a tire or to permit the injection of air into the tire. Thus pusher or stem 17 may move independently in an axial direction along axis 27 to engage the valve member of a valve core 21 in the valve stem 24. Two embodiments of the knob construction employing this concept are disclosed; namely, the approach or structure depicted in FIG. 3 and FIG. 5 as well as FIG. 3A and FIG. 5A.

The piston 14 includes multiple O-rings, such as O-ring 39 in grooves in the outer surface of the piston 14. Further, the piston 14 includes a projecting end section 40 which receives a valve core holder 42 retained tightly joined to the projecting end or fingers comprising end section 40 by means of an O-ring 44. The holder 42, which is illustrated in greater detail in FIG. 13, comprises a partially annular member that includes a slot 70 and is configured to fit under and engage a plunger 46 of a valve core 21 and may engage a lug 72 of a valve core 21 to enable release by rotation and unthreading or threading by reverse rotation of the valve core 21. Thus the O-ring 44 positioned around the projecting end or fingers 40 of the piston 14 compresses the valve core holder 42 in a manner which enables it to fit under the head of the plunger 46 and grip the plunger 46 as well as the valve core 22 in a fashion which enables that valve core 21 to be rotated, either clockwise or counterclockwise as the piston 14 is rotated by twisting knobs 18, 20.

The body 10 includes a piston brake or stopper 48 which limits the travel that the piston 14 may move axially into the body 10, but does not limit the movement of the valve core stem pusher 17. That is, the valve core pusher or stem 17 moves at least partially independently within the piston 14 in the manner previously described to engage a valve core plunger 46. Stem or pusher 17 movement is effected by engaging the knobs 18 and 20 and depressing those knobs axially in the direction of the outlet end 28 of the body 10. This distinction or difference in the axial distance of travel between the valve rod stem or pusher 17 and the piston 14 is effected by the axial movement of knob 20 relative to knob 18 and becomes important inasmuch as it represents the ability and capability of the stem or pusher 17 to independently move to engage the valve core plunger 46, even though the travel of the piston 14 is limited by stopper 48. Note that the tabs 32 which lock in the slot 34 are locked in that slot 34, or groove 34, whenever the valve core pusher 17 is engaged with a plunger 46 of a valve core 21. Releasing the tabs 32 from the groove 34 effects release of the pusher or stem 17 from engaging the plunger 46 inasmuch as the spring 38 biases the pusher or stem 17 axially away from the valve core 21.

Figures 10, 11, 12, 13:
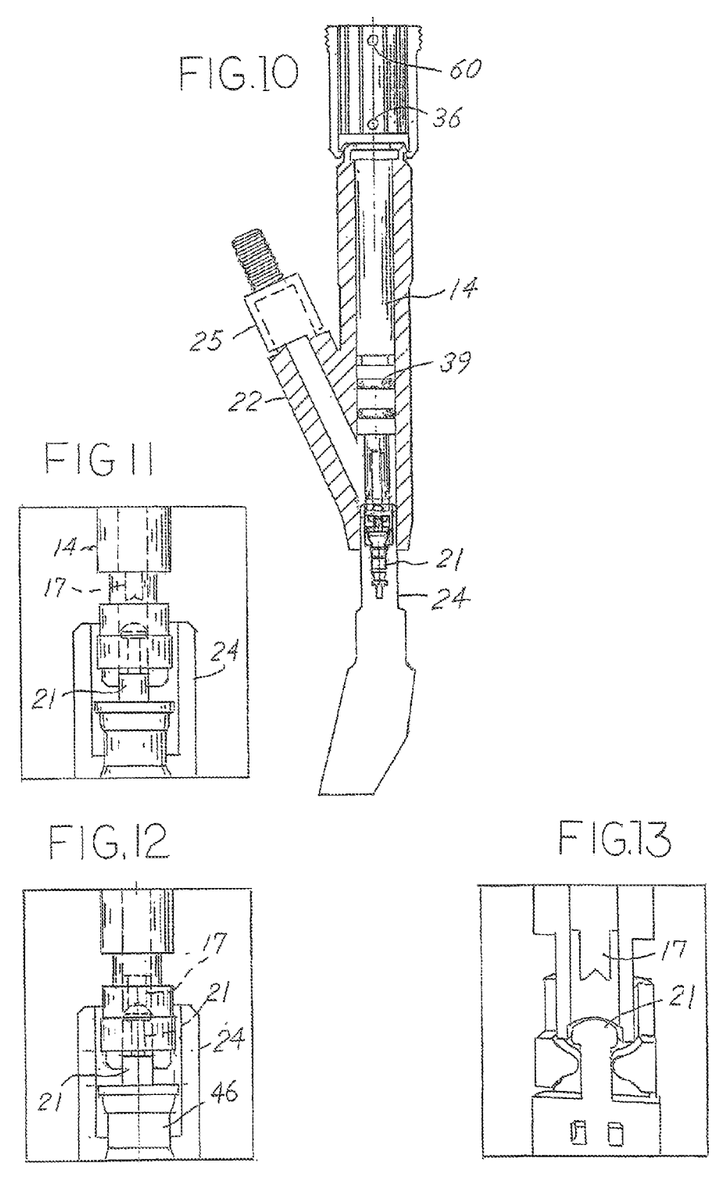
FIG. 10 is a sectional plan view of the tool wherein the valve core of the valve stem has been engaged to enable air or gas to be released through the tool.
FIG. 11 illustrates the mechanism of the tool for engaging the valve core of a valve stem prior to release of air through the valve core to the atmosphere.
FIG. 12 is a sectional view similar to FIG. 11 wherein the tool has been manipulated to engage the valve core of a valve stem in order to release air through the tool from the tire to which the valve stem is attached.
FIG. 13 is a sectional view illustrating the removal of a valve core from a valve stem by manipulating the tool to engage the valve core.
Figure 14:
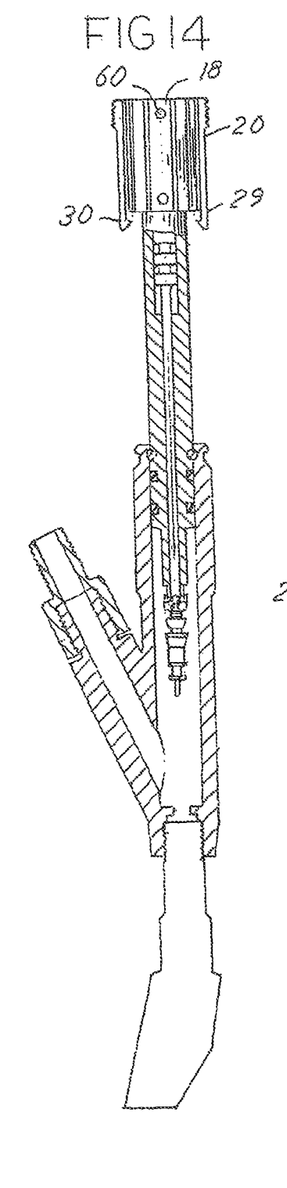
FIG. 14 is a sectional view of the tool wherein the tool has been manipulated to retract the valve core from the valve stem subsequent to engagement as illustrated in FIG. 13.

The operational steps of the use of the tool and the sequence of potential operations are illustrated beginning with FIG. 4. In FIG. 4 the knobs 18 and 20 are locked to the groove 34. More particularly, the tabs 32 are engaged with the groove 34. In this circumstance, a plunger 46 of a valve core is effectively engaged and pusher 17 may be depressed to drain or release air from a valve stem of a tire through the central passage 16 and the connector passage 22. The distinction between the positions of the end of the pusher or stein 17 with respect to engagement of a plunger 46 of a valve core 21 is depicted in the sequential FIGS. 11 and 12. FIG. 11 illustrates the condition of the position of the end of the stein or pusher 17 which engages the plunger 46 to permit air flow through the valve core 21.

Assuming adequate air has been released from the tire by actuation of the valve core 21 positioned within the valve stem 24 by pusher or stem 17, the next step is to insure that the valve core 21 is properly gripped by the holder 42 mounted at the end of the piston 14. Pushing the knobs 18 and 20 downwardly effects this operation. The valve core 21 being engaged may be removed by rotating piston 14 and unthreading or releasing valve core 21.

Figure 6:
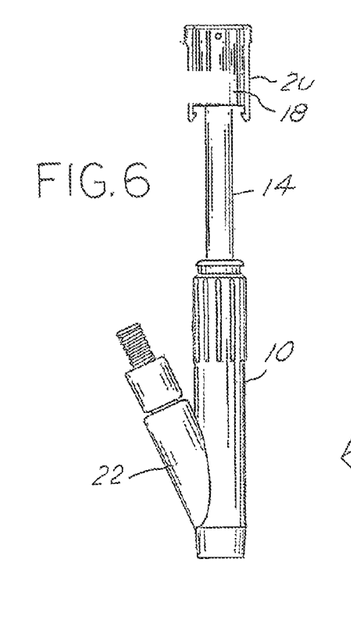
FIG. 6 is a plan view of the tool of FIG. 1 wherein the tool is positioned for mounting on a valve stem.
Figure 7:
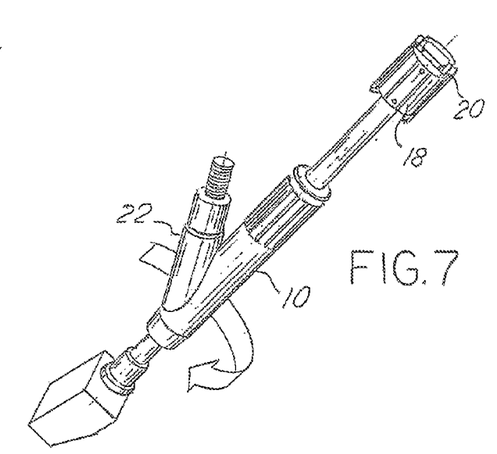
FIG. 7 is an isometric view depicting the attachment of the tool of the invention on the valve stem of a tire.
Figure 8:
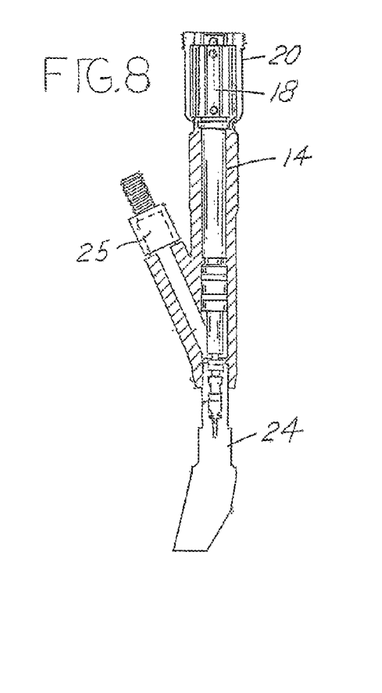
FIG. 8 is a sectional view of the tool depicting the manner in which the tool engages the valve core of a valve stem to which it is attached.
Figure 9:
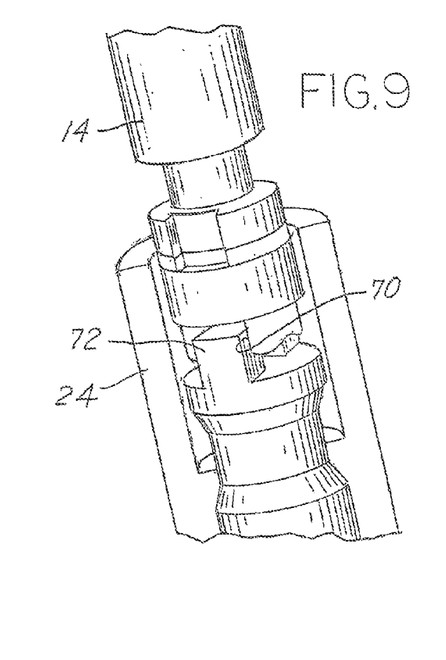
FIG. 9 is an enlarged perspective view of the manner of engagement of the tool with a valve core of a valve stem.
Figures 15, 16:
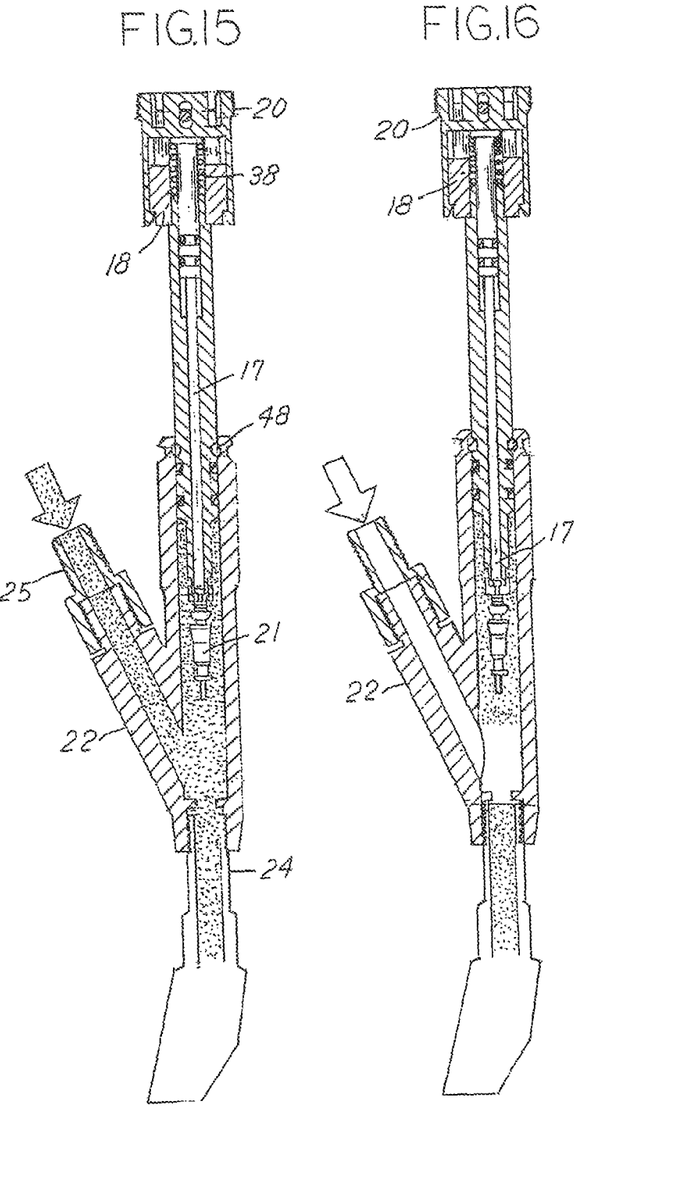
FIG. 15 is a sectional view of the tool wherein the valve core has been removed from the valve stem and sealant is introduced through the tool for flow through the valve stem to the interior of a tire to which the valve stem is attached.
FIG. 16 is a sectional view of the tool wherein air is injected through the tool to force sealant from the tool into the tire through the valve stem prior to insertion of the valve core.
Figure 17:
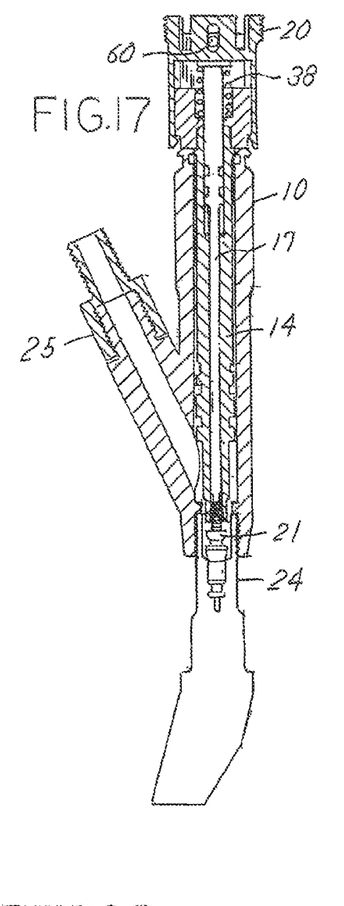
FIG. 17 is a sectional view illustrating manipulation of the tool to engage and position the valve core within the valve stem subsequent to introduction of sealant through the tool and to illustrate the forcing of residual sealant through the valve stem due to movement of the valve core.

FIG. 6 illustrates the manner in which the piston 14 may be withdrawn outwardly axially in the passage 12. That is, as described, the bottom end or holder of the piston 14 is moved axially downward to engage the valve core 21. This movement downward is illustrated in FIG. 8. FIG. 9 illustrates the manner in which the holder 42 engages the plunger 46 of the valve core 21. FIG. 13 illustrates in further detail the manner in which the valve core is engaged by the holder 42. Removal is effected by counterclockwise rotation of the knobs 18 and 20. The valve core 21 is then lifted into passage 12 to a position which exposes the gas flow passage 21. This is illustrated in FIG. 15. A sealant source is next attached to the passage 22A and sealant can then be fed through the connector 22, central passage 12, valve stem 24 and into the tire as shown in FIG. 15. Subsequently, the sealant source is removed from connection to the connector 22 as shown in FIG. 16 and air is injected through that passage 22A to transfer the residual sealing material through the valve stem 24 in to the tire. The plunger or piston 14 is then lowered through the passage 12 forcing the remaining sealant to flow into the tire and the knobs 18 and 20 are manipulated and locked to or engaged with the tool body 10 by means of the tabs 32 engaging the groove or slot 34. Pusher 17 may engage plunger 46 of valve core 21. Engagement causes the plunger 46 to be opened through the valve core 21 which has been rotated in order to reinsert the valve core in the stem. Air may then be inserted through the connector 22 and passage 22A and the longitudinal passage 12 at end 28 of the tool into the tire.

In summary referring to FIG. 3, the piston 14 is designed to slide within the passage 12 of the body 10 and includes an element or clamp at its inner end that engages a valve core 21 located in a valve stem 24. The engagement thereof enables the valve core 21 to be rotated in a clockwise or counterclockwise direction to insert or remove the valve core 21 from the valve stem 24 and to position the valve core 21 in a distal or spaced relation to the entry in the valve stein 24. The knob 18, 20 is designed to engage and drive the piston 14 and stem 17 longitudinally and to a limited extent independently.

The valve core stem or rod or pusher 17, which is slidably positioned within the passage 16 through the piston 14, is designed to engage the head or outer tip plunger 46 of the valve core 21 in order to release pressure from the tire 26 which is being repaired. The valve core stem or pusher 17 thus extends through an opening 28 in the knob 18 and may be engaged by the air rod drive knob 20 which is a component of knob 18.

In review, the sequence of operations when repairing a tire is to first place the tool body 10 over the valve stem 24 by threading it onto the valve stem 24. The piston 14 may then be engaged with the valve core 21. The valve core pusher or rod 17 may then be depressed to release air or gas from the tire through the valve stem 24. The rod actuating knob 20, piston knob 18 and piston 14 may then be rotated to release the valve core 21 from the valve stem 24. The piston knob 18 and integral stein engaging knob 20 may then be axially withdrawn to position the valve core 21 from the valve stem 24 into passage 16 of body 10. The connector 22 and passage 22A may then be connected to a sealant source. The sealant will then flow through the passage 22A and valve stem 24 into the tire.

Subsequently, the piston 14 and pusher 17 may be moved axially and longitudinally to reinsert the valve core 21 by appropriately rotating the valve core 21 back into the valve stem 24. This operation also transports any residual sealant through the valve stem 24 and into the tire. The connector 22 may then be connected to an air or gas source and the valve stem 24 depressed by means of movement of the pusher 17 and knob 20. The tire may thus be easily and adequately gas filled and pressurized. Release of the air engaging knob 20 will release the valve core 21 from engagement by spring biased rod or pusher 17. The entire tool may then be removed from the valve stem 24 by reversing or unthreading the tool 10 from the valve stem 24.

While there has been set forth an embodiment and alternatives of the invention, the invention is to be limited only by the following claims and equivalents.

What is claimed is:

1. A tire valve core removal and fluid injection tool comprising: a body having a longitudinal axis, a first end and a second end and a valve core storage passage sized to receive a valve core removed from an automobile tire stem; an annular piston positioned within said valve core storage passage having a cylindrical passage configured along said longitudinal axis; a valve core pushrod positioned within said cylindrical passage; a first knob located at the first end of said body for moving said valve core pushrod axially along said longitudinal axis and wherein rotation of said first knob results in rotation of said valve core pushrod; a transverse gas flow/sealant conduit in fluid connection with said valve core storage passage extending at an angle from said body and sized to enable a user to grip said tire valve core removal and fluid injection tool and to turn said tool along said longitudinal axis; an air knob positioned at the first end of said body and sized to fit over and slide with respect to said first knob; a spring surrounding said valve core pusher rod for biasing said valve core pusher rod away from said second end of said body along said longitudinal axis wherein said air knob is keyed to said valve core pusher rod and rotates with said valve core pusher rod independently of said annular piston; and a valve core holder positioned on said annular piston at said second end of said body sized to engage a valve core within an automotive tire valve stem and to cause removal of said valve core from said automotive tire valve stem by rotation of said first knob and air knob wherein said valve core is withdrawn into said valve core storage passage along said longitudinal axis above said transverse gas flow/sealant conduit.

2. The tire valve core removal and fluid injection tool of claim 1 wherein said second end of said body is sized to threadably engage in automotive tire valve stem prior to removal of said valve core therefrom.

3. The tire valve core removal and fluid injection tool of claim 1 wherein said valve core pusher rod is sized to release air from an automotive tire by depressing a plunger of an automotive tire valve core.

4. The tire valve core removal and fluid injection tool of claim 1 wherein said body comprises annular slots and said air knob is provided with projecting tabs sized and configured to engage said annular slots.

* * * * *